(12) United States Patent
Cho et al.

(10) Patent No.: US 8,400,383 B2
(45) Date of Patent: Mar. 19, 2013

(54) LIQUID CRYSTAL DISPLAY CAPABLE OF IMPROVING APERTURE RATIO AND DISPLAY QUALITY WITHOUT CHANGING A STORAGE CAPACITOR VOLTAGE

(75) Inventors: Sukho Cho, Gyeonggi-do (KR); Bumsik Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 819 days.

(21) Appl. No.: 12/292,696

(22) Filed: Nov. 24, 2008

(65) Prior Publication Data
US 2009/0290081 A1 Nov. 26, 2009

(30) Foreign Application Priority Data
May 23, 2008 (KR) .......................... 10-2008-0048295

(51) Int. Cl.
G09G 3/18 (2006.01)
G09G 3/20 (2006.01)
G09G 3/30 (2006.01)
G09G 3/36 (2006.01)
G09G 5/00 (2006.01)
G06F 3/038 (2006.01)
G02F 1/1343 (2006.01)
G02F 1/136 (2006.01)
G02F 1/1333 (2006.01)
G11C 11/34 (2006.01)
G11C 16/06 (2006.01)

(52) U.S. Cl. ................. 345/87; 345/54; 345/55; 345/79; 345/88; 345/92; 345/96; 345/98; 345/103; 345/204; 345/209; 349/39; 349/42; 349/43; 349/59; 349/143; 365/185.22

(58) Field of Classification Search ...................... 345/87
See application file for complete search history.

(56) References Cited

U.S. PATENT DOCUMENTS 7,679,596 B2 3/2010 Kim et al.
2005/0083467 A1* 4/2005 Lee et al. ...................... 349/141
(Continued)

FOREIGN PATENT DOCUMENTS
TW 200609869 3/2006

OTHER PUBLICATIONS

Abstract of Chinese Patent Publication No. 1734547-A, Feb. 15, 2006.

(Continued)

Primary Examiner — Alexander S Beck
Assistant Examiner — Karin Kiyabu
(74) Attorney, Agent, or Firm — Morgan, Lewis & Bockius LLP (57) ABSTRACT

A liquid crystal display is disclosed. The liquid crystal display includes a data line arranged in a column direction, a first pixel electrode that is positioned on the left side of the data line on a first line, a second pixel electrode that is positioned on the right side of the data line on the first line, a first gate line that is arranged between the first line and the second line in a line direction perpendicular to the column direction, a second gate line that is arranged between the first line and the second line in the line direction, the second gate line underlying the first gate line, a first thin film transistor that is positioned on the left side of the data line on the first line to supply a first data voltage received from the data line to the first pixel electrode in response to a gate pulse received from the first gate line, and a second thin film transistor that is positioned on the right side of the data line on the first line, crosses the first gate line to be connected to the second pixel electrode, and supplies a second data voltage received from the data line to the second pixel electrode in response to a gate pulse received from the second gate line.

6 Claims, 8 Drawing Sheets

U.S. PATENT DOCUMENTS

2005/0264744 A1* 12/2005 Kim et al. .................... 349/141
2006/0034125 A1* 2/2006 Kim et al. ................ 365/185.22
2006/0146209 A1* 7/2006 Kretz et al. .................... 349/38
2007/0058096 A1* 3/2007 Tsai et al. ...................... 349/38
2007/0247557 A1* 10/2007 Yeo et al. ....................... 349/43

OTHER PUBLICATIONS

Taiwanese Office Action dated Apr. 17, 2012, in Taiwanese counterpart application.

* cited by examiner

FIG. 1

PRIOR ART

LIQUID CRYSTAL DISPLAY CAPABLE OF IMPROVING APERTURE RATIO AND DISPLAY QUALITY WITHOUT CHANGING A STORAGE CAPACITOR VOLTAGE

This application claims the benefit of Korea Patent Application No. 10-2008-0048295 filed on May 23, 2008, which is hereby incorporated by reference in its entirety.

BACKGROUND OF THE INVENTION

1. Field of the Invention

An exemplary embodiment of the invention relates to a liquid crystal display.

2. Discussion of the Related Art

Active matrix type liquid crystal displays display a moving picture using a thin film transistor (TFT) as a switching element. The active matrix type liquid crystal displays have been implemented televisions as well as display devices in portable devices, such as office equipment and computers, because of the thin profile of the active matrix type liquid crystal displays. Accordingly, cathode ray tubes (CRT) are being replaced by active matrix type liquid crystal displays.

The active matrix type liquid crystal display includes data lines and gate lines crossing each other, and liquid crystal cells arranged at crossings of the data lines and the gate lines in a matrix format. A thin film transistor (TFT) is formed at each crossing of the data lines and the gate lines.

The liquid crystal display periodically inverts a polarity of a data voltage and supplies the inverted data voltage so as to reduce the degradation of liquid crystals. As above, a method for driving the liquid crystal display while the polarity of the data voltage is inverted is called an inversion system. Examples of the inversion system include a line inversion system, a column inversion system, and a dot inversion system.

In the line inversion system, the polarity of the data voltage is inverted every 1 line and is inverted every 1 frame period. In the line inversion system, because the adjacent liquid crystal cells in a line direction are different from each other in the data charge amount, a stripped pattern (i.e., a horizontal stripped pattern) may appear in the line direction.

In the column inversion system, the polarity of the data voltage is inverted every 1 column and is inverted every 1 frame period. In the column inversion system, because the adjacent liquid crystal cells in a column direction are different from each other in the data charge amount, a stripped pattern (i.e., a vertical stripped pattern) may appear in the column direction.

In the dot inversion system, the polarity of the data voltage supplied to the adjacent liquid crystal cells in the line direction is inverted, and the polarity of the data voltage supplied to the adjacent liquid crystal cells in the column direction is inverted. Further, the polarity of the data voltage is inverted every 1 frame period. Because flickers generated between adjacent pixels in vertical and horizontal directions offset each other in the dot inversion system, the dot inversion system can provide more excellent image quality than the line and column inversion systems. However, because the polarity of the data voltage supplied to the data lines has to be inverted in the vertical and horizontal directions in the dot inversion system, the change amount of the data voltage (i.e., a frequency of a data signal) in the dot inversion system is larger than the line and column inversion systems. Therefore, power consumption of a data drive circuit increase, and also the amount of heat generated in the data drive circuit increases.

Figure 1:
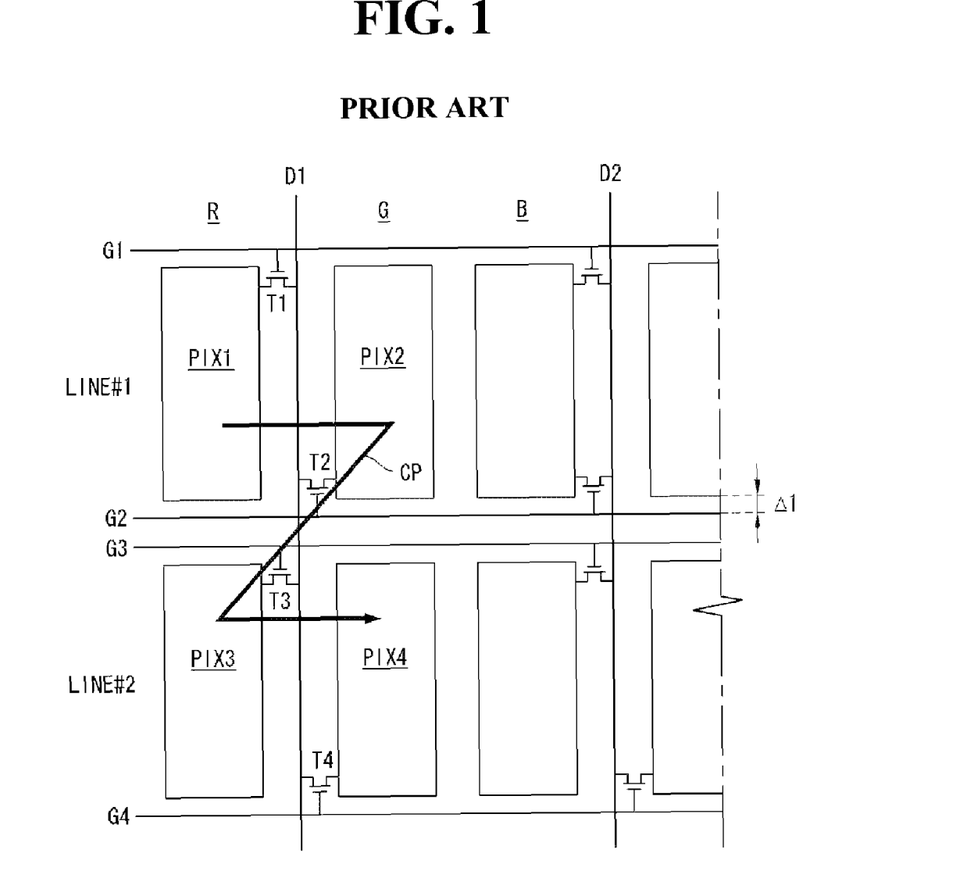
FIG. 1 shows a liquid crystal display driven in a related art Z-shaped inversion system.

Recently, as shown in FIG. 1, an inversion system in which data voltages received from one data line are alternately supplied to adjacent liquid crystal cells in a line direction has been proposed. Because a charge path of the data voltages is similar to a Z-shape, the inversion system is called a Z-shaped inversion system. In the Z-shaped inversion system, thin film transistors are formed on left and right sides of each data line, and a pixel electrode of a liquid crystal cell is connected to each thin film transistor.

In the Z-shaped inversion system, when a first gate pulse is applied to a first gate line G1, a first TFT T1 is turned on and the data voltage received from a first data line D1 is supplied to a first pixel electrode PIX1 positioned on the left side of the first data line D1. Sequentially, when a second gate pulse is applied to a second gate line G2, a second TFT T2 is turned on and the data voltage received from the first data line D1 is supplied to a second pixel electrode PIX2 positioned on the right side of the first data line D1. In the same way, when third and fourth gate pulses are sequentially applied to third and fourth gate lines G3 and G4, third and fourth TFTs T3 and T4 are turned on. Then, after the data voltage is supplied to a third pixel electrode PIX3, the data voltage is supplied to a fourth pixel electrode PIX4.

In the Z-shaped inversion system, the number of data lines can be reduced by half, and a frequency of the data voltage can be reduced. However, because the two gate lines are formed between the adjacent pixel electrodes in a column direction, the previously charged data voltage may be changed. For example, when a gate high voltage of the gate pulse is applied to the second gate line G2 in a state where the first pixel electrode PIX1 has been already charged to the data voltage, a voltage level of the first pixel electrode PIX1 may be changed by the coupling between the first pixel electrode PIX1 and the second gate line G2. This reason is that the gate high voltage changes a voltage of a storage capacitor for holding a voltage of the first pixel electrode PIX1 by a short distance Δ1 between the first pixel electrode PIX1 and the second gate line G2. If the distance Δ1 between the first pixel electrode PIX1 and the second gate line G2 increases, the coupling may be reduced, but an aperture ratio may be reduced.

Further, in the Z-shaped inversion system, because the data voltage charged to the liquid crystal cells of one of an R column, a G column, and a B column is different from the data voltage charged to the liquid crystal cells of the other columns depending on a polarity of the data voltage and the charge order of the data voltage, any one color may be seen more remarkably than the other colors on the display image.

SUMMARY OF THE INVENTION

An exemplary embodiment of the invention provides a liquid crystal display capable of securing a sufficient aperture ratio and improving the display quality without changing a voltage of a storage capacitor.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

In one aspect, a liquid crystal display comprises a data line that is arranged in a column direction to receive a data voltage, a first pixel electrode that is positioned on the left side of the data line on a first line, a second pixel electrode that is positioned on the right side of the data line on the first line, a first gate line that is arranged between the first line and the second line in a line direction perpendicular to the column direction, a second gate line that is arranged between the first line and the second line in the line direction, the second gate line underlying the first gate line, a first thin film transistor that is positioned on the left side of the data line on the first line to supply a first data voltage received from the data line to the first pixel electrode in response to a gate pulse received from the first gate line, and a second thin film transistor that is positioned on the right side of the data line on the first line, crosses the first gate line to be connected to the second pixel electrode, and supplies a second data voltage received from the data line to the second pixel electrode in response to a gate pulse received from the second gate line.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 2:
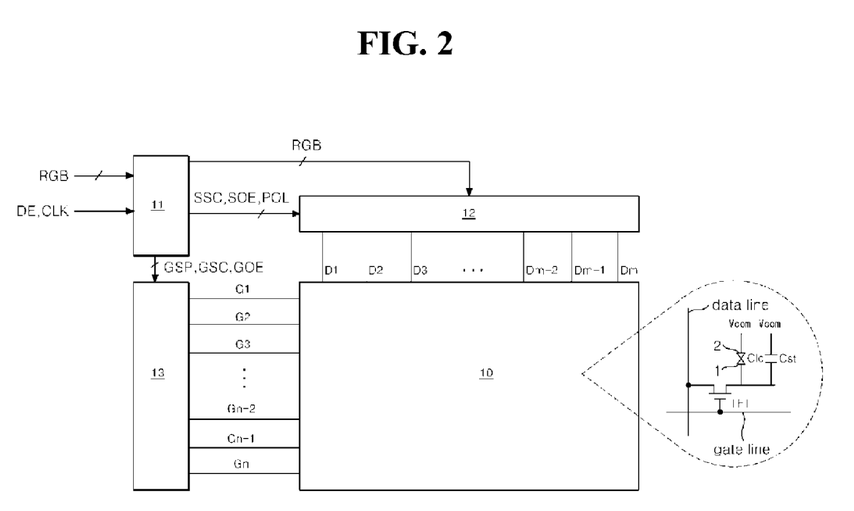
FIG. 2 is a block diagram of a liquid crystal display according to an exemplary embodiment of the invention.

As shown in FIG. 2, a liquid crystal display according to an exemplary embodiment of the invention includes a liquid crystal display panel 10, a timing controller 11, a data drive circuit 12, and a gate drive circuit 13.

Figure 3:
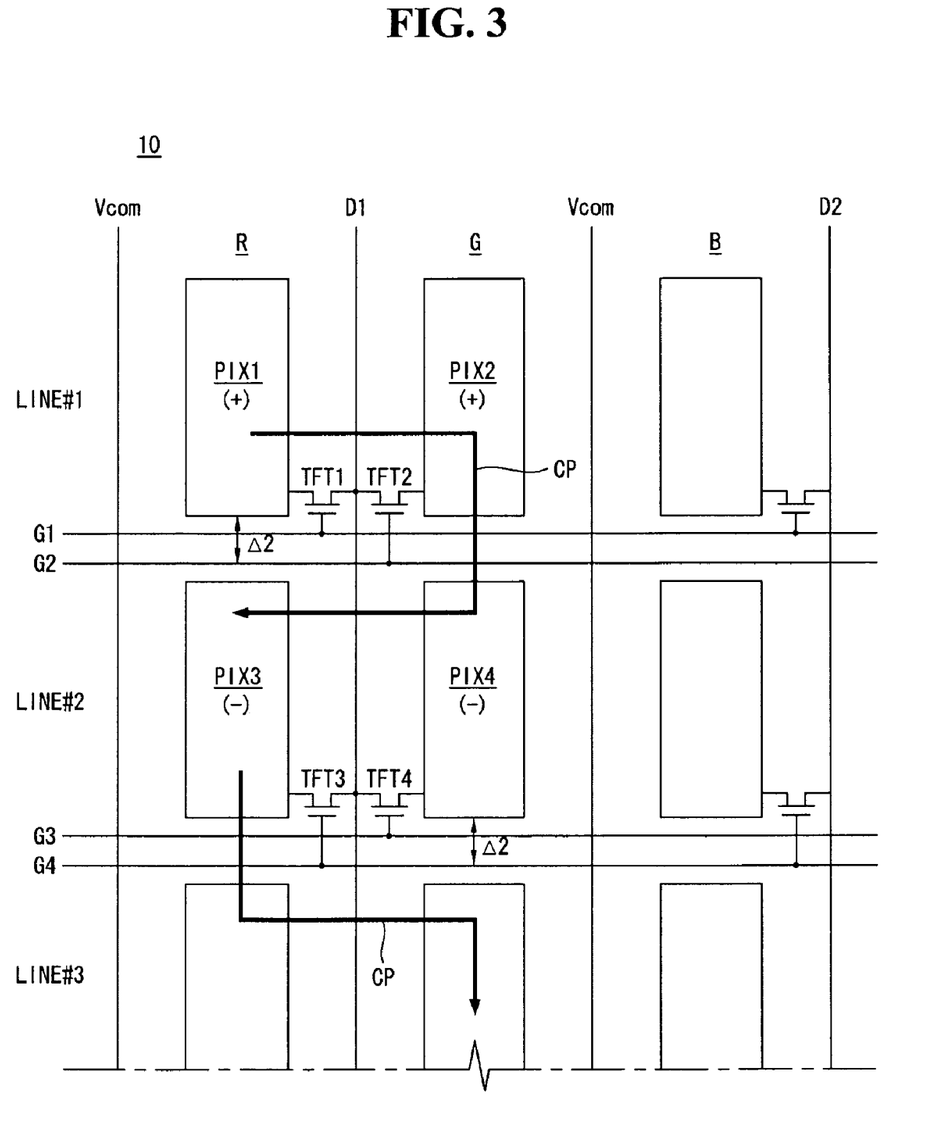
FIG. 3 is an equivalent circuit diagram showing a structure of a liquid crystal display panel, a polarity of a data voltage, and a charge path.
Figure 5:
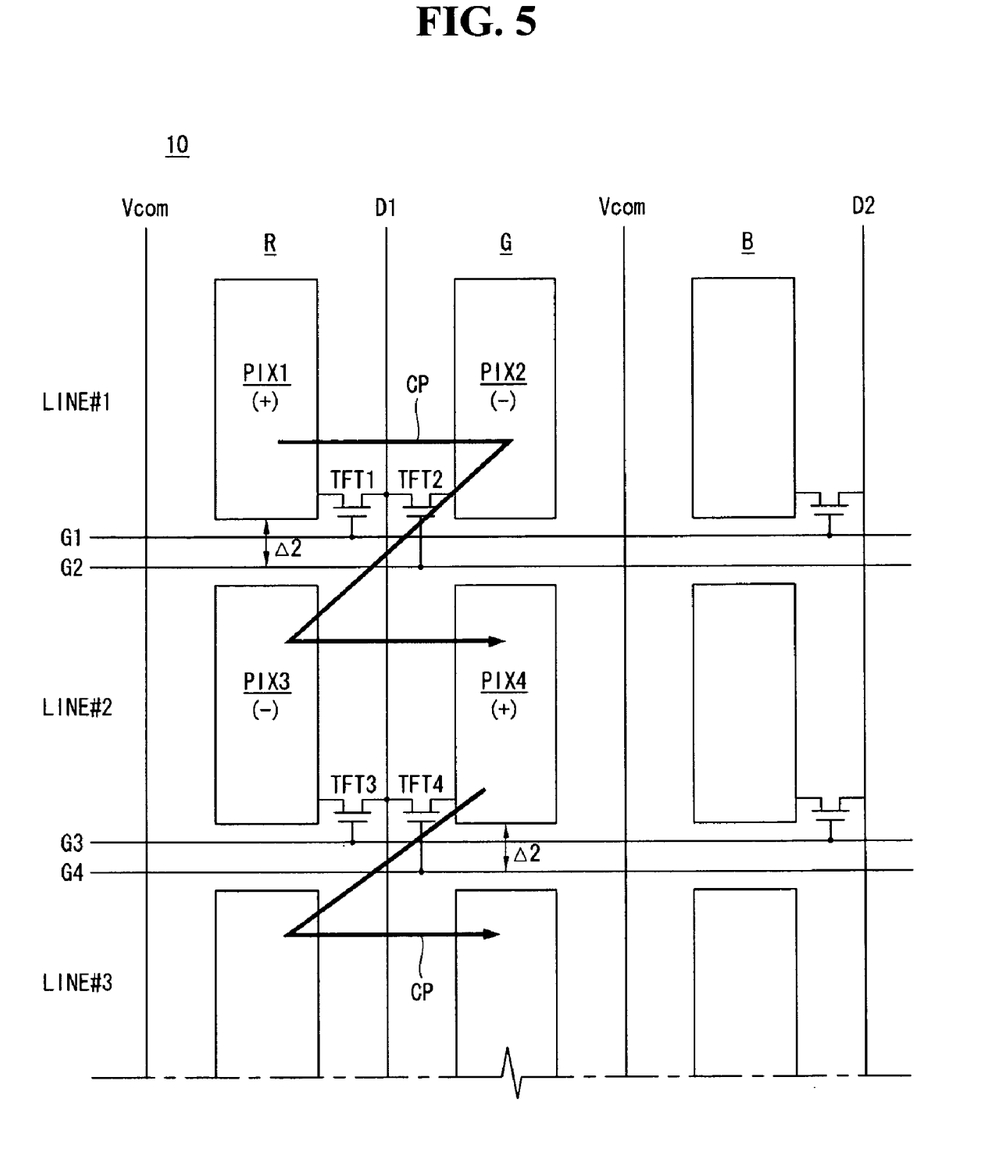
FIG. 5 is another equivalent circuit diagram showing a structure of a liquid crystal display panel, a polarity of a data voltage, and a charge path.
Figure 7:
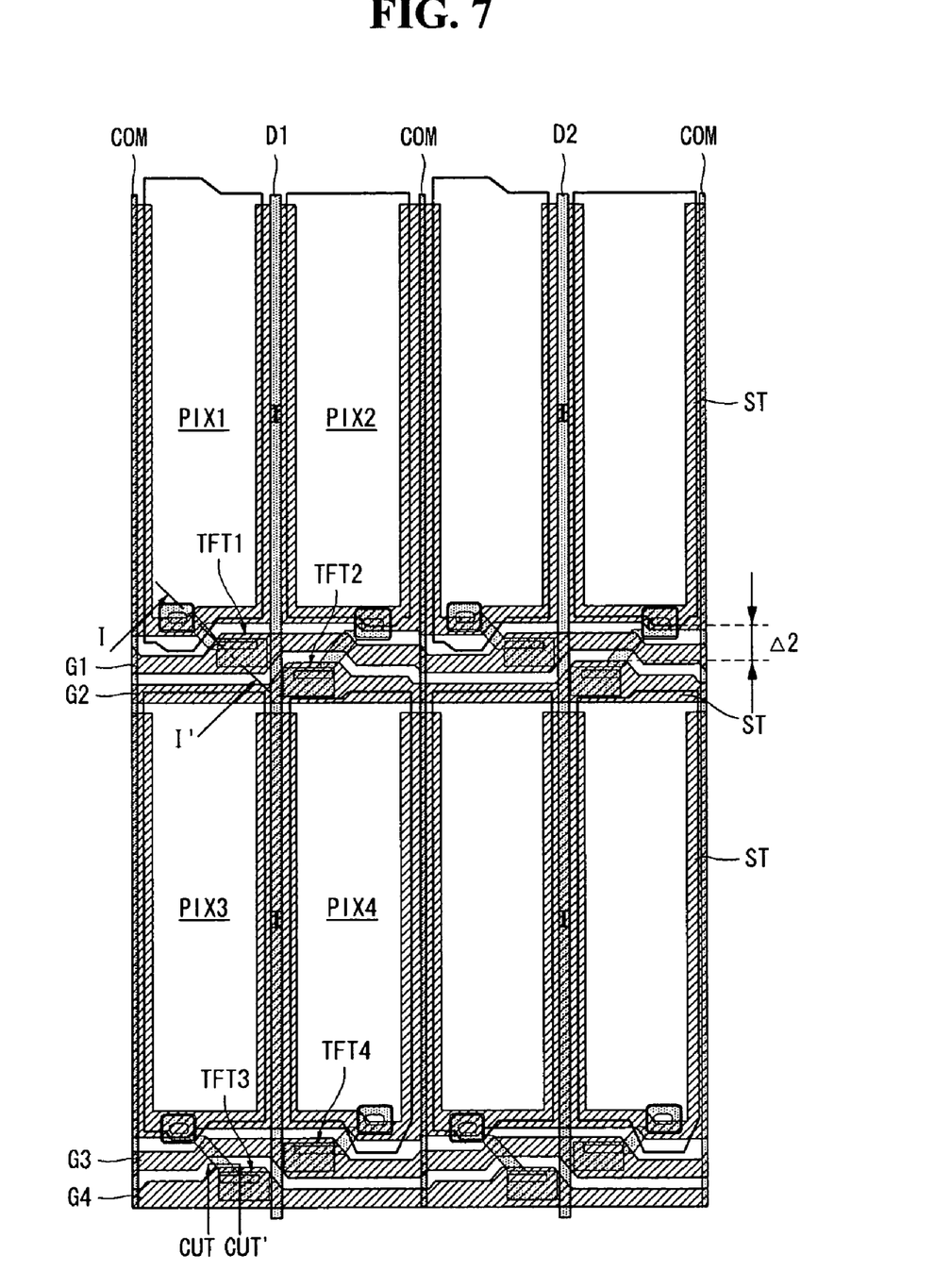
FIG. 7 is a plane view showing a lower glass substrate of the liquid crystal display panel according to the exemplary embodiment of the invention.
Figure 8:
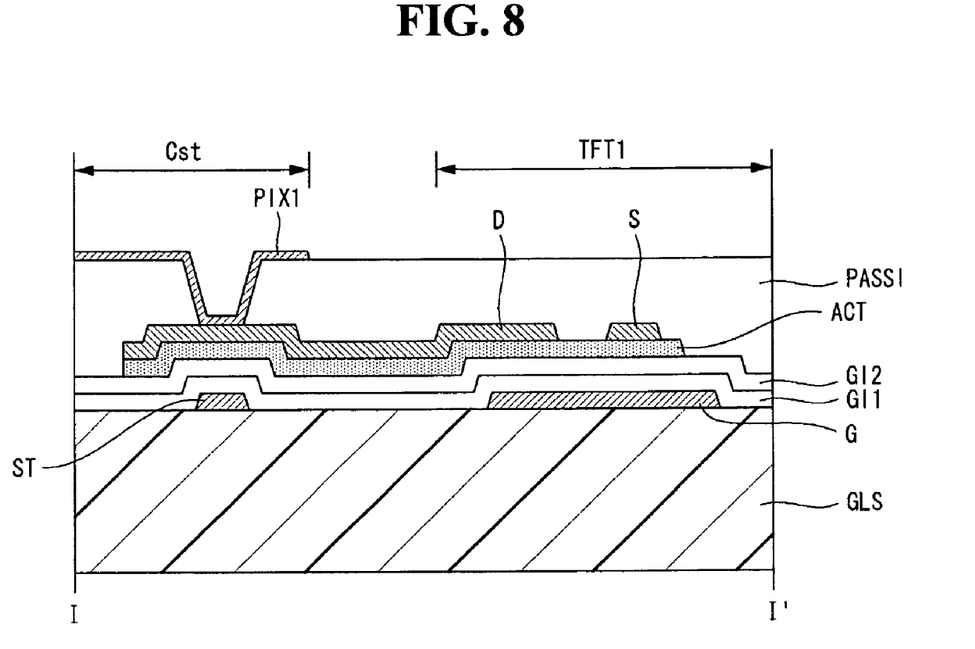
FIG. 8 is a cross-sectional view of a storage capacitor and a thin film transistor taken along line I-I' of FIG. 7.

The liquid crystal display panel 10 includes an upper glass substrate, a lower glass substrate, and a liquid crystal layer between the upper and lower glass substrates. The lower glass substrate of the liquid crystal display panel 10 includes data lines D1 to Dm in a column direction and gate lines G1 to Gn in a line direction that cross the data lines D1 to Dm. The lower glass substrate further includes common lines positioned between the data lines D1 to Dm in a direction parallel to the data lines D1 to Dm, and a storage electrode electrically connected to the common lines to receive a common voltage Vcom. The common lines are connected to a common voltage source generating the common voltage Vcom. The common line and the storage electrode are shown in FIGS. 7 and 8. The gate lines G1 to Gn, as shown in FIGS. 3 and 5, are formed in a structure in which the odd-numbered gate lines and the even-numbered gate lines adjacent to the odd-numbered gate lines are formed in pairs between adjacent pixel electrodes 1 in the column direction. Liquid crystal cells Clc are arranged on a pixel array of the liquid crystal display panel 10 in a matrix format at crossings of the data lines D1 to Dm and the gate lines G1 to Gn. The lower glass substrate further includes a thin film transistor formed at each crossing of the data lines D1 to Dm and the gate lines G1 to Gn, the pixel electrode 1 of the liquid crystal cell Clc connected to the thin film transistor one to one, and a storage capacitor Cst, and the like. The upper glass substrate of the liquid crystal display panel 10 includes a black matrix, a color filter, and a common electrode 2.

The common electrode 2 is formed on the upper glass substrate in a vertical electric drive manner, such as a twisted nematic (TN) mode and a vertical alignment (VA) mode. The common electrode 2 and the pixel electrode 1 are formed on the lower glass substrate in a horizontal electric drive manner, such as an in-plane switching (IPS) mode and a fringe field switching (FFS) mode. Polarizing plates each having optical axes that cross at a right angle are attached respectively to the upper and lower glass substrates. Alignment layers for setting a pre-tilt angle of the liquid crystal in an interface contacting the liquid crystal are respectively formed on the upper and lower glass substrates.

A structure of each of the data line, the gate line, the pixel electrode 1, and the thin film transistor on the lower glass substrate is shown in FIGS. 3 and 5. Although FIGS. 3 and 5 show the structure to which the vertical electric drive manner is applied, the exemplary embodiment of the invention is not limited thereto. The exemplary embodiment of the invention may be applied to any liquid crystal mode.

The timing controller 11 rearranges digital video data RGB in the charge order of a data voltage in the liquid crystal display panel 10 as shown in FIGS. 3 to 6, and then supplies the rearranged digital video data RGB to the data drive circuit 12. The timing controller 11 receives a timing signal such as a data enable signal DE and a dot clock signal CLK, and generates a data timing control signal for controlling operation timing of the data drive circuit 12 and a gate timing control signal for controlling operation timing of the gate drive circuit 13.

The data timing control signal includes a source start pulse SSP, a source sampling clock signal SSC, a source output enable signal SOE, a polarity control signal POL, and the like. The source start pulse SSP indicates a start pixel in 1 horizontal line to which data will be displayed. If the data transmission between the timing controller 11 and the data drive circuit 12 is performed using mini low-voltage differential signaling (LVDS), the digital video data RGB and mini LVDS clock are transmitted to the data drive circuit 12. When the data is transmitted using the mini LVDS, the timing controller 11 does not need to generate a separate source start pulse because a pulse following a reset pulse of the mini LVDS clock serves as a source start pulse. The source sampling clock signal SSC controls a data latch operation inside the data drive circuit 12 based on a rising or falling edge. The source output enable signal SOE controls an output of the data drive circuit 12. A logic state of the polarity control signal POL is inverted every 1 horizontal period or 2 horizontal periods, and a phase of the polarity control signal POL is inverted every N frame periods, where N is a positive integer.

The gate timing control signal includes a gate start pulse GSP, a gate shift clock signal GSC, a gate output enable signal GOE, and the like. The gate start pulse GSP indicates a scan start line of a scan operation during 1 vertical period in which one screen is displayed. The gate shift clock signal GSC is a timing control signal that is input to a shift resistor installed in the gate drive circuit 13 to sequentially shift the gate start pulse GSP, and has a pulse width corresponding to a turned-on period of the thin film transistor. The gate output enable signal GOE controls an output of the gate drive circuit 13.

The data drive circuit 12 latches the digital video data RGB under the control of the timing controller 11 and converts the digital video data RGB into positive and negative gamma compensation voltages to generate positive and negative data voltages. The positive and negative data voltages are supplied to the data lines D1 to Dm. The data drive circuit 12 inverts a polarity of the data voltage in response to the polarity control signal POL. The data drive circuit 12 time-divides R-data voltage of the odd-numbered pixels and G-data voltage of the odd-numbered pixels to supply the R-data voltage and the G-data voltage to the odd-numbered data lines D1, D3, . . . and Dm−1 during one-half horizontal period. Further, the data drive circuit 12 time-divides B-data voltage of the odd-numbered pixels and R-data voltage of the even-numbered pixels to supply the B-data voltage and the R-data voltage to the even-numbered data lines D2, D4, . . . , and Dm during one-half horizontal period.

The gate drive circuit 13 includes a shift resistor, a level shifter for converting an output signal of the shift resistor into a signal having a swing width suitable for a TFT drive of the liquid crystal cell Clc, an output buffer, and the like to sequentially supply the gate pulses to the gate lines G1 to Gn. A gate high voltage of the gate pulse is supplied to the gate lines G1 to Gn during one-half horizontal period so as to be synchronized with the data voltage.

FIG. 3 is an equivalent circuit diagram showing a structure of the lower glass substrate of the liquid crystal display panel 10, the polarity of the data voltage, and a charge path. The structure of the lower glass substrate shown in FIG. 3 shows not the whole of the pixel array but the pixel array formed on first to third lines LINE#1 to LINE#3 in an area of the odd-numbered pixel.

As shown in FIG. 3, pixel electrodes PIX1 and PIX3 of R-liquid crystal cells are formed on R-column on the left side of a first data line D1 in a column direction, and pixel electrodes PIX2 and PIX4 of G-liquid crystal cells are formed on G-column on the right side of the first data line D1 in the column direction.

The first data line D1 is connected to the pixel electrodes PIX1 and PIX3 on the R-column via thin film transistors TFT1 and TFT3 on the R-column, and is connected to the pixel electrodes PIX2 and PIX4 on the G-column via thin film transistors TFT2 and TFT4 on the G-column.

Common lines COM for supplying the common voltage Vcom to the storage electrode are formed parallel to the data lines D1 to Dm on the outermost left side and the outermost right side of the pixel array. The common lines COM are formed between the adjacent pixel electrodes positioned between the adjacent data lines in a direction parallel to the data lines D1 to Dm. The common lines COM are formed between the R-column and the G-column in an area of the even-numbered pixel in a direction parallel to the data lines D1 to Dm. The storage electrode and the common lines COM are spaced apart from each other at a predetermined interval, for example, at an interval of k lines, where k is a natural number equal to larger than 4. The storage electrode and the common lines COM are electrically connected to each other through a contact hole passing through an insulating layer.

The first gate line G1 is formed between first and second lines LINE#1 and LINE#2 in a line direction perpendicular to the column direction and is connected to a gate electrode of the first thin film transistor TFT1. The second gate line G2 is formed between the first and second lines LINE#1 and LINE#2 in the line direction and is connected to a gate electrode of the second thin film transistor TFT2. The second gate line G2 underlying the first gate line G1 crosses the first gate line G1 to be connected to the gate electrode of the second thin film transistor TFT2. Accordingly, because a distance $\Delta 2$ between the second gate line G2 and the first pixel electrode PIX1 increases as compared with the related art distance $\Delta 1$ (i.e., $\Delta 2 > \Delta 1$), electrical coupling is scarcely generated between the second gate line G2 and the first pixel electrode PIX1. It is advantageous that the distance $\Delta 2$ is 20 μm to 40 μm in consideration of a gate high voltage equal to or higher than 20V so that the electrical coupling is scarcely generated between the second gate line G2 and the first pixel electrode PIX1.

Third and fourth gate lines G3 and G4 are formed between a second line LINE#2 and a third line LINE#3 underlying the second line LINE#2 in the line direction. The third gate line G3 is connected to a gate electrode of a fourth thin film transistor TFT4. The fourth gate line G4 underlying the third gate line G3 crosses the third gate line G3 to be connected to a gate electrode of a third thin film transistor TFT3. Accordingly, because a distance $\Delta 2$ between the fourth gate line G4 and the fourth pixel electrode PIX4 increases as compared with the related art distance $\Delta 1$ (i.e., $\Delta 2 > \Delta 1$), electrical coupling is scarcely generated between the fourth gate line G4 and the fourth pixel electrode PIX4. It is advantageous that the distance $\Delta 2$ is 20 μm to 40 μm.

A voltage charge path CP (i.e., the charge order of the data voltage) of the liquid crystal cells of the R-column and the liquid crystal cells of the G-column to which the R-data voltage and the G-data voltage are alternately supplied through the first data line D1 is determined by supply order of the gate pulses to the first to fourth gate lines G1 to G4 and the first to fourth thin film transistors TFT1 to TFT4 that are sequentially turned on by the gate pulses. The charge order of the liquid crystal cells of the R-column and the liquid crystal cells of the G-column in the odd-numbered frame will be described later.

Figure 4:
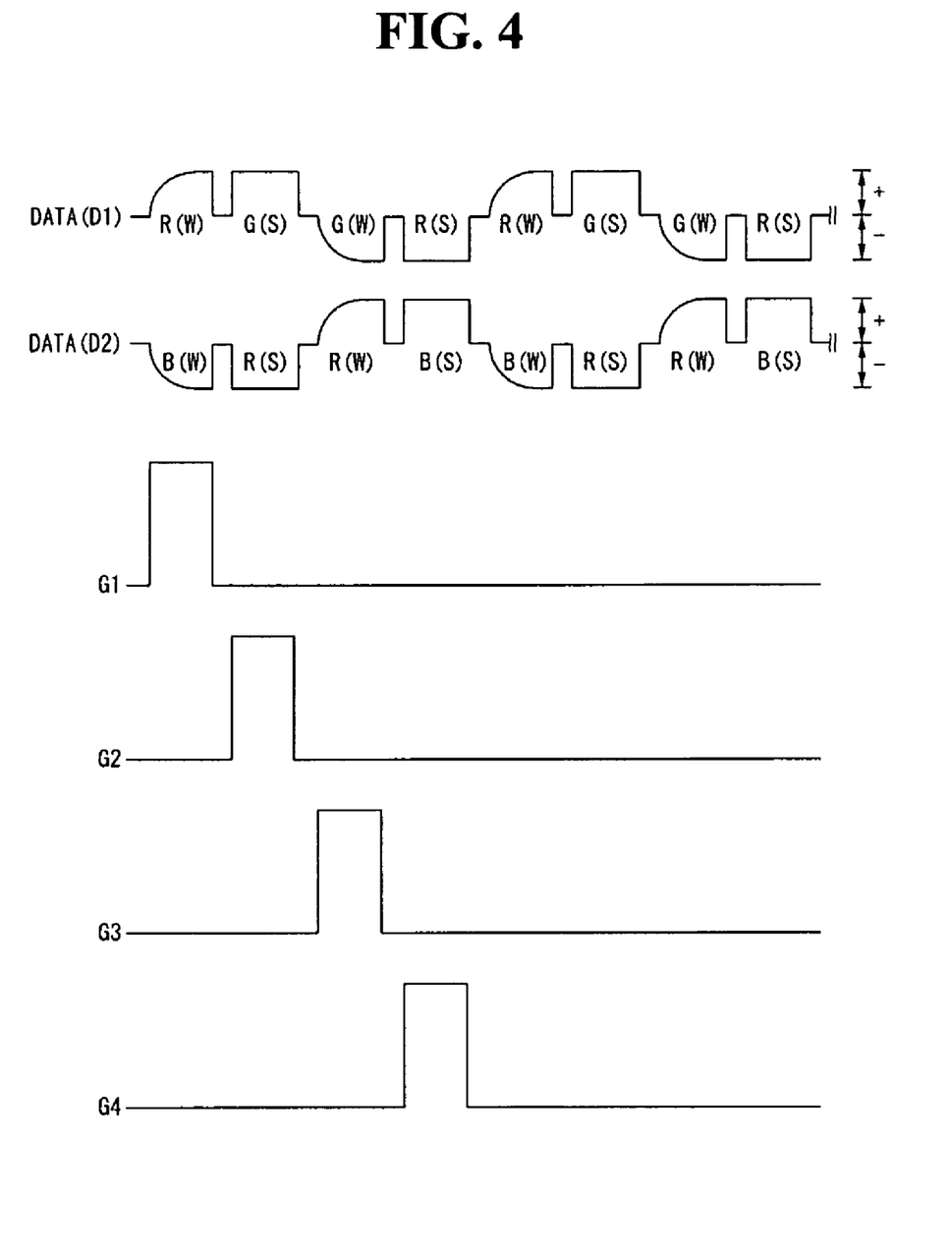
FIG. 4 is a waveform diagram illustrating the data voltage shown in FIG. 3 and a gate pulse.

As shown in FIGS. 3 and 4, the gate pulses are sequentially applied to the gate lines G1 to G4, and different data voltages having the same polarity are respectively applied to the data lines D1 and D2 during 1 horizontal period. Polarities of the data voltages are inverted every 1 horizontal period.

A first gate pulse is applied to the first gate line G1, and the first thin film transistor TFT1 is turned on by the first gate pulse. Hence, positive R-data voltage received from the first data line D1 is supplied to the first pixel electrode PIX1 positioned on the left side of the first data line D1 on the first line LINE#1. Next, a second gate pulse is applied to the second gate line G2. Because the distance $\Delta 2$ between the first pixel electrode PIX1 and the second gate line G2 is long, a voltage of the storage capacitor Cst connected to the first pixel electrode PIX1, that has been already charged to the data voltage, is scarcely affected by the gate high voltage of the second gate pulse and does not change. The second thin film transistor TFT2 is turned on by the second gate pulse. Hence, positive G-data voltage received from the first data line D1 is supplied to the second pixel electrode PIX2 positioned on the right side of the first data line D1 on the first line LINE#1.

Sequential to the second gate pulse, a third gate pulse is applied to the third gate line G3, and the fourth thin film transistor TFT4 is turned on by the third gate pulse. Hence, negative G-data voltage received from the first data line D1 is supplied to the fourth pixel electrode PIX4 positioned on the right side of the first data line D1 on the second line LINE#2. Next, a fourth gate pulse is applied to the fourth gate line G4. Because the distance Δ2 between the fourth pixel electrode PIX4 and the fourth gate line G4 is long, a voltage of the storage capacitor Cst connected to the fourth pixel electrode PIX4, that has been already charged to the data voltage, is scarcely affected by the gate high voltage of the fourth gate pulse and does not change. The third thin film transistor TFT3 is turned on by the fourth gate pulse. Hence, negative R-data voltage received from the first data line D1 is supplied to the third pixel electrode PIX3 positioned on the left side of the first data line D1 on the second line LINE#2.

A polarity of the data voltage in even-numbered frames is inverted to a polarity opposite a polarity of the data voltage in odd-numbered frames.

As above, the liquid crystal display according to the exemplary embodiment of the invention reduces the electrical coupling between the pixel electrode and the gate line by lengthening the distance Δ2 between the pixel electrode and the gate line and minimizes a change in the voltage to which the liquid crystal cell is charged, thereby improving the display quality. Furthermore, in the Z-shaped inversion system, when the polarity of the data voltage is inverted every 2 dots (2 liquid crystal cells) in the line direction and is inverted every 1 dot in the column direction, color distortion, in which any one color of a display image is more remarkably seen than the other colors, may appear. However, the liquid crystal display according to the exemplary embodiment of the invention changes the charge order of the data voltage, thereby reducing the color distortion. For example, as shown in FIG. 4, during a horizontal period, the first pixel electrode PIX1 is charged to the positive R-data voltage, and then the positive G-data voltage is supplied to the second pixel electrode PIX2. Because the first pixel electrode PIX1 is charged to the positive R-data voltage from the negative data voltage that has been already charged, the charge amount of first pixel electrode PIX1 is less than the charge amount of second pixel electrode PIX2 during the 1 horizontal period. During a next horizontal period, the fourth pixel electrode PIX4 is charged to the negative G-data voltage, and then the negative R-data voltage is supplied to the third pixel electrode PIX3. Because the fourth pixel electrode PIX4 is charged to the negative G-data voltage from the positive data voltage that has been already charged, the charge amount of fourth pixel electrode PIX4 is less than the charge amount of third pixel electrode PIX3 during the next 1 horizontal period. Accordingly, because an average voltage of the R-liquid crystal cells and an average voltage of the G-liquid crystal cells are substantially equal to each other on the first and second lines LINE#1 and LINE#2, any one color of the display image is not remarkably seen. In FIG. 4, "W" indicates a voltage level of the pixel electrode whose the charge amount is small, and "S" indicates a voltage level of the pixel electrode whose the charge amount is relatively large.

Figure 6:
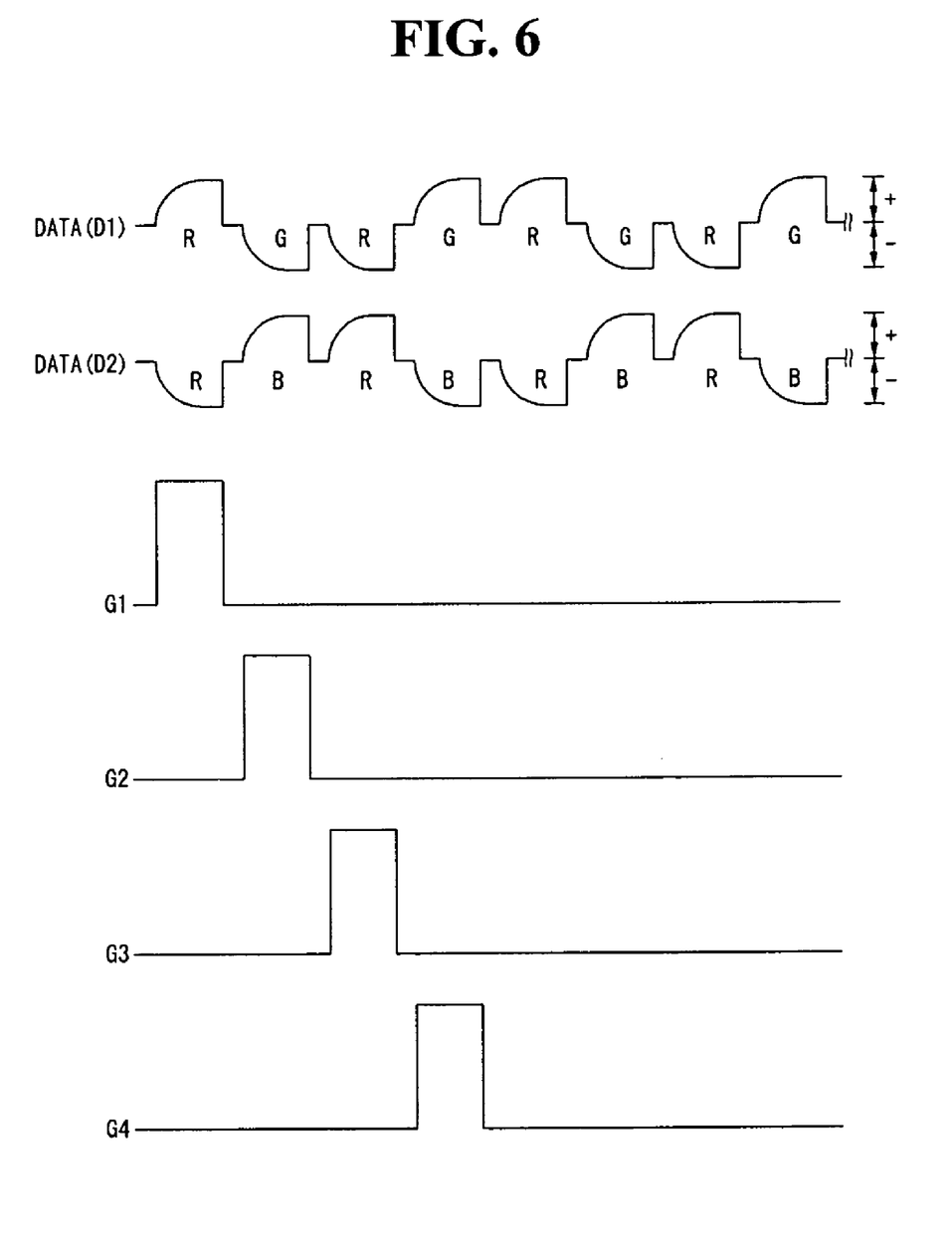
FIG. 6 is a waveform diagram illustrating the data voltage shown in FIG. 5 and a gate pulse.

FIGS. 5 and 6 show a polarity of the data voltage and a charge path of the data voltage. The structure of the lower glass substrate of the liquid crystal display panel 10 in an odd-numbered line, namely, the first line LINE#1 is substantially the same as that in the first line LINE#1 shown in FIG. 3. In an even-numbered line LINE#2, unlike the structure shown in FIG. 3, the third gate line G3 is formed between the second and third lines LINE#2 and LINE#3 in the line direction and is connected to the gate electrode of the third thin film transistor TFT3 on the left side of the first data line D1. The fourth gate line G4 underlying the third gate line G3 is formed between the second and third lines LINE#2 and LINE#3 and crosses the third gate line G3 to be connected to the gate electrode of the fourth thin film transistor TFT4 on the right side of the first data line D1.

As shown in FIGS. 5 and 6, the gate pulses synchronized with the data voltage are sequentially applied to the gate lines G1 to G4, and the data voltages whose polarities are inverted every one-half horizontal period are respectively applied to the data lines D1 and D2.

A first gate pulse is applied to the first gate line G1, and the first thin film transistor TFT1 is turned on by the first gate pulse. Hence, positive R-data voltage received from the first data line D1 is supplied to the first pixel electrode PIX1 positioned on the left side of the first data line D1 on the first line LINE#1. Next, a second gate pulse is applied to the second gate line G2. Because the distance Δ2 between the first pixel electrode PIX1 and the second gate line G2 is long, a voltage of the storage capacitor Cst connected to the first pixel electrode PIX1, that has been already charged to the data voltage, is scarcely affected by the gate high voltage of the second gate pulse and does not change. The second thin film transistor TFT2 is turned on by the second gate pulse. Hence, negative G-data voltage received from the first data line D1 is supplied to the second pixel electrode PIX2 positioned on the right side of the first data line D1 on the first line LINE#1.

Sequential to the second gate pulse, a third gate pulse is applied to the third gate line G3, and the third thin film transistor TFT3 is turned on by the third gate pulse. Hence, negative R-data voltage received from the first data line D1 is supplied to the third pixel electrode PIX3 positioned on the left side of the first data line D1 on the second line LINE#2. Next, a fourth gate pulse is applied to the fourth gate line G4. Because the distance Δ2 between the third pixel electrode PIX3 and the fourth gate line G4 is long, a voltage of the storage capacitor Cst connected to the third pixel electrode PIX3, that has been already charged to the data voltage, is scarcely affected by the gate high voltage of the fourth gate pulse and does not change. The fourth thin film transistor TFT4 is turned on by the fourth gate pulse. Hence, positive G-data voltage received from the first data line D1 is supplied to the fourth pixel electrode PIX4 positioned on the right side of the first data line D1 on the second line LINE#2.

FIGS. 7 and 8 are a plane view and a cross-sectional view showing in detail the lower glass substrate of the liquid crystal display panel 10 shown in FIG. 3, respectively.

As shown in FIGS. 7 and 8, in the exemplary embodiment of the invention, a gate metal is formed on the lower glass substrate GLS using a deposition method such as sputtering. The gate metal is patterned using a photolithography process to form the gate lines G1 to G4, the gate electrodes G of the thin film transistors connected to the gate lines G1 to G4, a storage electrode ST, and gate metal patterns (not shown) including a lower electrode of a gate pad. The storage electrode ST overlaps 3 edges of the pixel electrode including a left edge, a right edge, and a bottom end edge of the pixel electrode, and overlaps the underlying gate lines G2 and G4 in each gate line pair (i.e., the gate line pairs G1 and G2 and G3 and G4). The storage electrode ST overlaps the common line COM with gate insulating layers to be described later interposed therebetween, and is connected to the common line COM through the contact hole to receive the common voltage from the common line COM. The lower electrode of the gate pad is formed at ends of the gate lines G1 to G4 and is connected to an upper electrode of the gate pad. The gate metal may include aluminum (Al)-based metal including Al, aluminum/neodymium (Al/Nd).

First and second gate insulating layers GI1 and GI2 are sequentially deposited on the lower glass substrate and the gate metal patterns using an inorganic insulating material such as $SiO_2$, SiNx to cover the gate metal patterns. Then, first contact holes passing through the first and second gate insulating layers GI1 and GI2 are formed using the photolithography process. The first contact holes are spaced apart from each other at a predetermined distance to expose the storage electrodes ST at the predetermined distance. Subsequently, an active semiconductor pattern ACT including an active layer and an ohmic contact layer is formed on the second gate insulating layer GI2 using the photolithography process. Further, source/drain metal patterns including the data lines D1 and D2, a source electrode S and a drain electrode D of the thin film transistor connected to the data lines D1 and D2, the common line COM connected to the storage electrode ST through the first contact hole, a lower electrode of a common line pad connected to an end of the common line COM, and a lower electrode of the data pad (not shown) are formed on the active semiconductor pattern ACT using the photolithography process. As described above, the first contact holes are spaced apart from each other at an interval of k lines to connect the storage electrode ST to the common line COM, where k is a natural number equal to or larger than 4. The drain electrodes are connected to the pixel electrodes PIX1 to PIX4, and some of the drain electrodes cross the gate lines and are patterned in the form of boots so as to be connected to the pixel electrodes PIX1 to PIX4. The active layer of the active semiconductor pattern ACT is formed of non-doped amorphous silicon, and the ohmic contact layer of the active semiconductor pattern ACT is formed of amorphous silicon doped with N-type or P-type impurity. The lower electrode of the data pad is formed at ends of the data lines D1 and D2 and is connected to the upper electrode of the data pad. The source/drain metal patterns may be formed of metal such as molybdenum (Mo) and copper (Cu).

Subsequently, a protective layer PASSI formed of an inorganic or organic insulating material is formed on the lower glass substrate and the source/drain metal patterns to cover the source/drain metal patterns. A second contact hole that passes through the protective layer PASSI to expose the drain electrode D, a third contact hole that passes through the protective layer PASSI to expose the lower electrode of the data pad, a fourth contact hole that passes through the protective layer PASSI and the gate insulating layers GI1 and GI2 to expose the lower electrode of the gate pad, and a fifth contact hole that passes through the protective layer PASSI to expose the lower electrode of the common line pad are formed using the photolithography process.

Subsequently, a transparent conductive layer selected from indium tin oxide (ITO), tin oxide (TO), indium tin zinc oxide (ITZO), and indium zinc oxide (IZO) is deposited on the protective layer PASSI using a deposition method such as sputtering, and then is patterned using the photolithography process to form transparent conductive layer patterns. The transparent conductive layer patterns are connected to the drain electrode D through the second contact hole. The transparent conductive layer patterns include the pixel electrodes PIX1 to PIX4 overlapping the gate line and the storage electrode ST, the upper electrode of the data pad connected to the lower electrode of the data pad through the third contact hole, the upper electrode of the gate pad connected to the lower electrode of the gate pad through the fourth contact hole, and the upper electrode of the common line pad connected to the lower electrode of the common line pad through the fifth contact hole. The upper electrode of the data pad is connected to an output pad of a source driver IC constituting the data drive circuit 12 to transmit the data voltage to the data lines D1 and D2 through the lower electrode of the data pad. The upper electrode of the gate pad is connected to an output pad of a gate driver IC constituting the gate drive circuit 13 to transmit the gate pulses to the gate lines G1 to G4 through the lower electrode of the gate pad. The upper electrode of the common line pad transmits the common voltage Vcom received from a common voltage source to the common line COM through the lower electrode of the common line pad.

The storage capacitor Cst includes the pixel electrodes PIX1 to PIX4 and the storage electrode ST that overlap each other with an inorganic or organic insulating layer interposed therebetween. The storage capacitor Cst is formed between the pixel electrodes PIX1 to PIX4 and the gate lines that overlap each other with an inorganic or organic insulating layer interposed therebetween. Because the storage capacitor Cst is formed along 4 sides of each of the pixel electrodes PIX1 to PIX4, a capacitance of the storage capacitor Cst greatly increases. Hence, the storage capacitor Cst can be stably charged to the data voltage.

It is easy to repair the defective liquid crystal cell as a dark defect cell in a repair process because of a portion of the storage capacitor Cst overlapping the gate line. For example, it is assumed that the liquid crystal display is driven in a normally white mode in which the lower a voltage of the liquid crystal cell is, the higher a transmittance of the liquid crystal cell is. If the data voltage is not supplied to the third pixel electrode PIX3 because of the defective third thin film transistor TFT3, bright defect occurs in the third liquid crystal cell including the third pixel electrode PIX3 in an inspection process. In this case, the drain electrode D of the third thin film transistor TFT3 is cut along cut line CUT-CUT using a laser beam in a repair process to open a current path between the third thin film transistor TFT3 and the third pixel electrode PIX3. Subsequently, in the storage capacitor Cst, an upper end of the third thin film transistor TFT3 overlapping the second gate line G2, the protective layer PASSI underlying the third thin film transistor TFT3, and the gate insulating layers GI1 and GI2 are melted using a laser beam to electrically connect an upper end of the third pixel electrode PIX3 to a portion of the second gate line G2 overlapping the third pixel electrode PIX3. As a result, a gate low voltage of about −5V is applied to the third pixel electrode PIX3 through the second gate line G2, and the common voltage of about 5V is applied to the common electrode 2 of the upper glass substrate opposite the third pixel electrode PIX3. Hence, about 10V is applied to the third liquid crystal cell, and thus the third liquid crystal cell is repaired as a dark defect cell representing a black gray level. The gate low voltage is a voltage supplied to the gate lines G1 to G4 during a non-scanning period and is lower than a turn-on voltage of the TFT. The gate high voltage is a voltage of the gate pulse supplied to the gate lines G1 to G4 during scan time, namely, one-half horizontal period and is equal to or higher than the turn-on voltage of the TFT.

The liquid crystal display according to the exemplary embodiment does not change the voltage of the storage capacitor and can sufficiently secure the aperture ratio in the Z-shaped inversion system, in which the data voltages are alternately charged in zigzag, without a reduction in the aperture ratio by increasing the distance between the pixel electrode and the gate line, thereby improving the display quality.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display comprising:
a first and a second data lines that are arranged in a column direction to receive a data voltage;
a first pixel electrode that is positioned on the left side of the first data line on a first line;
a second pixel electrode that is positioned on the right side of the first data line on the first line;
a first gate line that is arranged between the first line and a second line underlying the first line in a line direction perpendicular to the column direction;
a second gate line that is arranged between the first line and the second line in the line direction, the second gate line underlying the first gate line;
a first thin film transistor that is positioned on the left side of the first data line on the first line to supply a first data voltage received from the first data line to the first pixel electrode in response to a first gate pulse received from the first gate line;
a second thin film transistor that is positioned on the right side of the first data line on the first line, crosses over the first gate line to be connected to the second pixel electrode, and supplies a second data voltage received from the first data line to the second pixel electrode in response to a second gate pulse received from the second gate line;
a third gate line that is arranged between the second line and a third line underlying the second line in the line direction;
a fourth gate line that is arranged between the second line and the third line in the line direction, the fourth gate line underlying the third gate line;
a third pixel electrode that is positioned on the left side of the first data line on the second line;
a fourth pixel electrode that is positioned on the right side of the first data line on the second line;
a third thin film transistor that is positioned on the left side of the first data line on the second line, crosses over the third gate line to be connected to the third pixel electrode, and supplies a fourth data voltage received from the first data line to the third pixel electrode in response to a fourth gate pulse received from the fourth gate line; and
a fourth thin film transistor that is positioned on the right side of the first data line on the second line to supply a third data voltage received from the first data line to the fourth pixel electrode in response to a third gate pulse received from the third gate line,
wherein the first to fourth gate pulses are sequentially supplied to the first to fourth gate lines, respectively,
wherein the first, second, third and fourth data voltages are sequentially supplied to the first, second, fourth and third pixel electrodes, respectively, and
wherein different data voltages having a same polarity are respectively applied to the first and second data lines during 1 horizontal period, and polarities of the data voltages being inverted every 1 horizontal period.

2. The liquid crystal display of claim 1, further comprising:
a storage electrode that overlaps a left edge, a right edge, and a bottom end edge of each of the first to fourth pixel electrodes with an insulating layer interposed between the storage electrode and each of the first to fourth pixel electrodes; and
a common line that is arranged in parallel with the first and second data lines between a pair of pixel electrodes to supply a common voltage to the storage electrode.

3. The liquid crystal display of claim 2, further comprising a storage capacitor that is connected to each of the first to fourth pixel electrodes to hold a voltage of each pixel electrode,
wherein the storage capacitor includes a first storage capacitor including the 3 edges of each pixel electrode and the storage electrode that overlap each other with an insulating layer interposed between the storage electrode and each of the first to fourth pixel electrodes, and a second storage capacitor including a top end edge of each pixel electrode and the first to fourth gate lines that overlap each other with the insulating layer interposed between the gate lines and each pixel electrode.

4. A liquid crystal display comprising:
a first and a second data lines that are arranged in a column direction to receive a data voltage;
a first pixel electrode that is positioned on the left side of the first data line on a first a second pixel electrode that is positioned on the right side of the first data line on the first line;
a first gate line that is arranged between the first line and a second line underlying the first line in a line direction perpendicular to the column direction;
a second gate line that is arranged between the first line and the second line in the line direction, the second gate line underlying the first gate line;
a first thin film transistor that is positioned on the left side of the first data line on the first line to supply a first data voltage received from the first data line to the first pixel electrode in response to a first Rate pulse received from the first gate line;
a second thin film transistor that is positioned on the right side of the first data line on the first line, crosses over the first gate line to be connected to the second pixel electrode, and supplies a second data voltage received from the first data line to the second pixel electrode in response to a second gate pulse received from the second gate line;
a third gate line that is arranged between the second line and a third line underlying the second line in the line direction;
a fourth gate line that is arranged between the second line and the third line in the line direction, the fourth gate line underlying the third gate line;
a third pixel electrode that is positioned on the left side of the first data line on the second line;
a fourth pixel electrode that is positioned on the fight side of the first data line on the second line;
a third thin film transistor that is positioned on the left side of the first data line on the second line to supply a third data voltage received from the first data line to the third pixel electrode in response to a third gate pulse received from the third gate line; and
a fourth thin film transistor that is positioned on the right side of the first data line on the second line, crosses over the third gate line to be connected to the fourth pixel electrode, and supplies a fourth data voltage received from the first data line to the fourth pixel electrode in response to a fourth gate pulse received from the fourth gate line,
wherein the first to fourth gate pulses are sequentially supplied to the first to fourth pixel electrodes, respectively, wherein the first to fourth data voltages are sequentially supplied to the first to fourth pixel electrodes, respectively, and wherein polarities of the first to fourth data voltages are inverted every one-half horizontal period.

5. The liquid crystal display of claim 4, further comprising:

a storage electrode that overlaps a left edge, a right edge, and a bottom end edge of each of the first to fourth pixel electrodes with an insulating layer interposed between the storage electrode and each of the first to fourth pixel electrodes; and a common line that is arranged in parallel with the first and second data lines between a pair of pixel electrodes and is connected to the storage electrode to supply a common voltage to the storage electrode.

6. The liquid crystal display of claim 5, further comprising a storage capacitor that is connected to each of the first to fourth pixel electrodes to hold a voltage of each pixel electrode, wherein the storage capacitor includes a first storage capacitor including the 3 edges of each of the first to fourth pixel electrodes and the storage electrode that overlap each other with the insulating layer interposed between the storage electrode and each of the first to fourth pixel electrodes, and a second storage capacitor including a top end edge of each pixel electrode and the first to fourth gate lines that overlap each other with the insulating layer interposed between the gate lines and each of the first to fourth pixel electrodes.

* * * * *